United States Patent
Han et al.

(10) Patent No.: US 8,988,555 B2
(45) Date of Patent: Mar. 24, 2015

(54) DIGITAL IMAGE SIGNAL PROCESSING APPARATUS AND METHOD FOR PERFORMING CONTINUOUS PHOTOGRAPHING

(75) Inventors: Kyu-chun Han, Seoul (KR); Su-jin Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 13/217,585

(22) Filed: Aug. 25, 2011

(65) Prior Publication Data

US 2012/0162469 A1   Jun. 28, 2012

(30) Foreign Application Priority Data

Dec. 23, 2010 (KR) .................. 10-2010-0133714

(51) Int. Cl.
*H04N 5/76* (2006.01)
*H04N 5/77* (2006.01)
*G06F 17/30* (2006.01)

(52) U.S. Cl.
CPC .......... *H04N 5/772* (2013.01); *G06F 17/30274* (2013.01)
USPC ....................................................... 348/231.2

(58) Field of Classification Search
USPC ................. 348/231.2, 207.2, 231.99
See application file for complete search history.

(56) References Cited

U.S. PATENT DOCUMENTS

| | | | |
|---|---|---|---|
| 7,657,568 B2 * | 2/2010 | Shimosato | 348/231.2 |
| 8,264,564 B2 * | 9/2012 | Kita | 348/222.1 |
| 2004/0070673 A1 * | 4/2004 | Nakamura | 348/207.2 |
| 2007/0013788 A1 * | 1/2007 | Kaibara | 348/231.2 |
| 2007/0013790 A1 * | 1/2007 | Nakase | 348/231.99 |
| 2008/0089616 A1 * | 4/2008 | Gwak | 382/309 |
| 2009/0167873 A1 * | 7/2009 | Sakaue et al. | 348/207.2 |
| 2009/0180003 A1 * | 7/2009 | Cho | 348/231.2 |
| 2010/0134644 A1 * | 6/2010 | Kita | 348/222.1 |

* cited by examiner

*Primary Examiner* — Aung S Moe
*Assistant Examiner* — Amy Hsu
(74) *Attorney, Agent, or Firm* — Drinker Biddle & Reath LLP

(57) ABSTRACT

Provided is a digital image signal processing method and apparatus which generates a first continuous-captured image in a continuous-photographing mode, generates a first name of the first continuous-captured image according to DCF rules, generates a second name of a second continuous-captured image following the first continuous-captured image according to the DCF rules, generates first continuous-photographing number information indicating an order of continuous-photographing of the first continuous-captured image, and generates a first file comprising the first continuous-captured image, the first name, the second name, and the first continuous-photographing number information. In this way, continuous-captured images and images obtained before and after the continuous-captured images can be effective played back.

34 Claims, 12 Drawing Sheets

DIGITAL IMAGE SIGNAL PROCESSING APPARATUS AND METHOD FOR PERFORMING CONTINUOUS PHOTOGRAPHING

CROSS-REFERENCE TO RELATED PATENT APPLICATION

This application claims the benefit of Korean Patent Application No. 10-2010-0133714, filed on Dec. 23, 2010, in the Korean Intellectual Property Office, the entire disclosure of which is incorporated herein by reference.

BACKGROUND

1. Field of the Invention

The invention relates to a digital image signal processing apparatus and method for performing continuous photographing, and more particularly to a digital image signal processing apparatus and method for performing continuous photographing where rules other than DCF rules are used.

2. Description of the Related Art

In a continuous-photographing mode, images are continuously stored with different file names. In a play mode, continuously captured files and normally captured files are played back from an identical play list composed therefor. Thus, an image captured before or after continuous photographing can be checked only after all the continuously captured files are played back. For example, after an object which moves little is continuously captured, especially when the number of continuously captured images is large, an image captured before or after continuous photographing can be checked only after the same or similar continuously captured images are all checked.

Often, a play list is composed in a way other than Design Rule for Camera File Systems (DCF) rules to play back images, but in this case, playback may be impossible on some device.

SUMMARY

Therefore, there is a need in the art for a digital image signal processing method including generating a first continuous-captured image in a continuous-photographing mode, generating a first name of the first continuous-captured image according to DCF rules, generating a second name of a second continuous-captured image following the first continuous-captured image according to the DCF rules, generating first continuous-photographing number information indicating an order of continuous-photographing of the first continuous-captured image, and generating a first file comprising the first continuous-captured image, the first name, the second name, and the first continuous-photographing number information.

According to another aspect of the invention, there is provided a digital image signal processing apparatus including a continuous-captured image generating unit which generates a first continuous-captured image in a continuous-photographing mode, a DCF generating unit which generates a first name of the first continuous-captured image according to DCF rules and generates a second name of a second continuous-captured image following the first continuous-captured image according to the DCF rules, a continuous-photographing number information generating unit which generates first continuous-photographing number information indicating an order of continuous-photographing of the first continuous-captured image, and a file generating unit which generates a first file comprising the first continuous-captured image, the first name, the second name, and the first continuous-photographing number information.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

As an example of a digital image signal processing apparatus according to the invention, a digital camera will be described with reference to the accompanying drawings. However, the invention is not limited to the digital camera and can also be applied to digital apparatuses such as a digital camcorder, a smart phone, a personal digital assistant (PDA), a portable multimedia player (PMP), and so forth.

Figure 1:
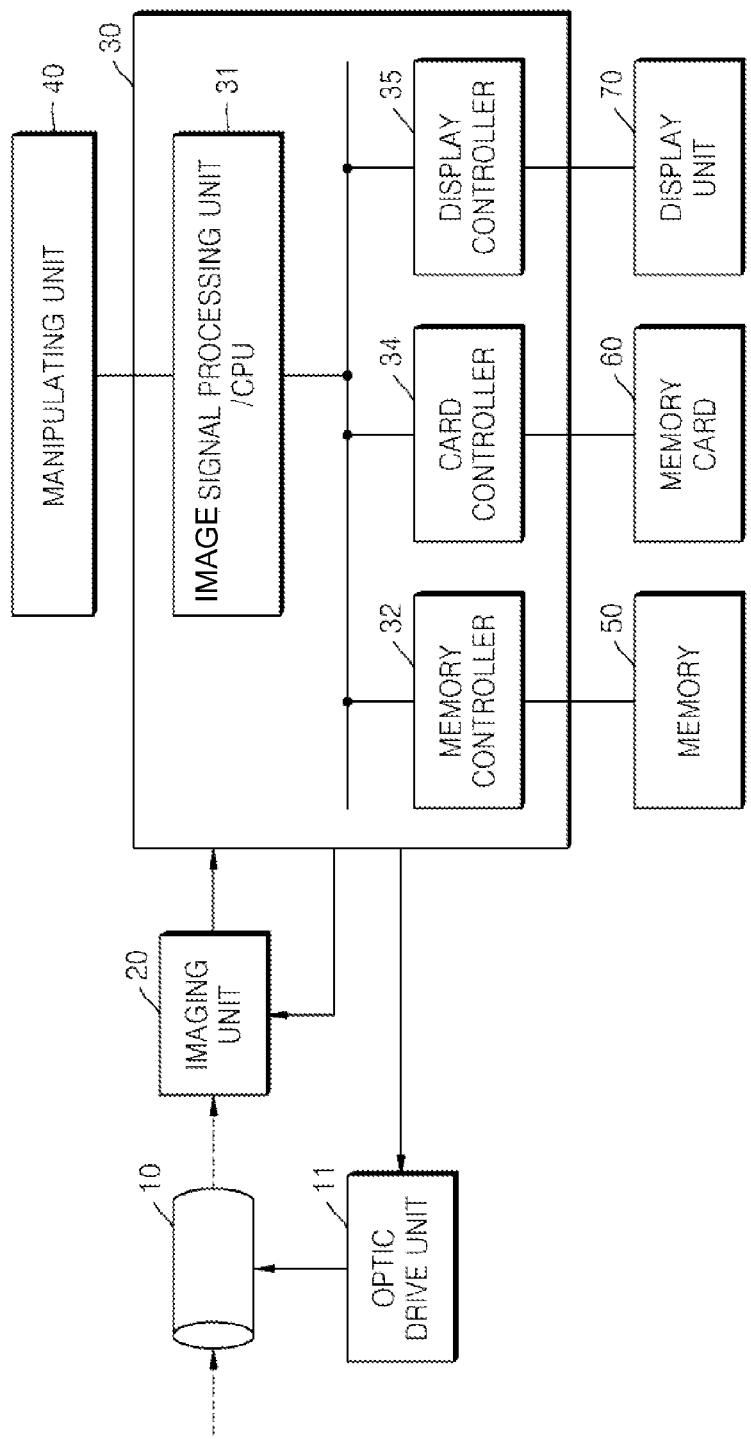
FIG. 1 is a block diagram of a digital camera as an example of a digital image signal processing apparatus according to the invention.

FIG. 1 is a block diagram of a digital camera as an example of a digital image signal processing apparatus according to the invention.

Referring to FIG. 1, the digital camera includes a photographing unit, a camera control unit 30, a manipulating unit 40, a memory 50 as a storing unit, and a display unit 70 implemented with a touch screen.

The photographing unit includes an optic unit 10, an optic drive unit 11 for driving the optic unit 10, and an imaging unit 20.

The optic unit 10 includes an imaging optical system for collecting an optical signal from an object, a shutter, and an iris. The imaging optical system includes a focus lens for adjusting the focus on the object and a zoom lens for adjusting a focal length.

The optic drive unit 11 may include a focus lens drive unit for adjusting a position of the focus lens, an iris drive unit for adjusting iris diaphragm, and a shutter drive unit for adjusting opening and closing of the shutter.

The imaging unit 20 includes an imaging element for imaging an image light passing through the imaging optical system of an interchangeable lens and generating an image signal. The imaging element includes a plurality of photoelectric conversion units arranged in a matrix form and a vertical or/and horizontal transmission path for moving electric charges from the photoelectric conversion units in sync with a timing signal to derive the image signal. The imaging element may be a charge coupled device (CCD) sensor, a complementary metal oxide semiconductor (CMOS) sensor, or the like. When the CCD sensor is used as the imaging element, the imaging unit 20 may further include a correlated double sampling (CDS) circuit/amplifier (AMP) for canceling low-frequency noise included in an electric signal output from the imaging element and amplifying the electric signal to an arbitrary level and an analog-to-digital (A/D) converter for converting the electric signal output from the CDS circuit/AMP into a digital signal.

The digital camera includes the camera control unit 30. The camera control unit 30 includes an image signal processing unit/central processing unit (CPU) 31.

The image signal processing unit/CPU 31 calculates, for the image signal obtained from the imaging unit 20, an auto white balance (AWB) evaluation value for white balance adjustment, an auto exposure (AE) evaluation value for exposure adjustment, and auto focusing (AF) evaluation value for focus adjustment, and properly controls white balance, exposure, and auto-focus adjustment according to the calculated evaluation values. For the input image signal, the image signal processing unit/CPU 31 may also execute various applications such as object recognition, e.g., face recognition, scene recognition, and so forth. The image signal processing unit/CPU 31 may also perform image processing for record keeping and image processing for display. As examples of image processing, gamma correction, color filter array interpolation, color matrix, color correction, color enhancement, and the like may be performed. For record keeping, compression into a Joint Photographic Experts Group (JPEG) compression format or a Lempel-Ziv-Welch (LZW) compression format may be performed.

The image signal processing unit/CPU 31 generates a first continuous-captured image in a continuous-photographing mode, generates a first name of the first continuous-captured image according to DCF rules, generates a second name of a second continuous-captured image following the first continuous-captured image according to the DCF rules, generates first continuous-capture number information indicating an order of continuous-photographing of the first continuous-captured image, and generates a first file including the first continuous-captured image, the first name, the second name, and the first continuous-capture number information. An operation of file generation and playback with respect to continuous-captured images for playback of the continuous-captured images will be described in detail with reference to the drawings.

The camera control unit 30 includes a memory controller 32, a card controller 34, and a display controller 35.

The memory controller 32 may temporarily store captured images or various information in the memory 50, or output the captured images or various information from the memory 50. The memory controller 32 may also read out program information stored in the memory 50. The memory 50 is a buffer memory for temporarily storing captured images or various information and may include a dynamic random access memory (DRAM), synchronous DRAM (SDRAM), or the like. The memory 50 is a storing unit for storing programs and may include a flash memory, a read only memory (ROM), etc.

The card controller 34 may store image files in the memory card 60 and read out image files from the memory card 60. The card controller 34 may also control reading out and storing various information to be kept as well as image files. The memory card 60 may be a secure digital (SD) card. While the memory card 60 has been used as a storage medium in the current embodiment, the storage medium is not limited to the memory card 60 such that image files and various information may be stored by using a recording medium such as an optical disk (compact disc (CD), digital versatile disk (DVD), blue-ray disk, etc.), a magnetic-optical disk, a magnetic disk, or the like. In this case, a reading device for reading such a recording medium may be further included.

The display controller 35 may control image display of the display unit 70. The display unit 70 may use a liquid crystal display (LCD), an organic light emitting diode (OLED), or the like. On the display unit 70 may also be mounted a touch panel.

The digital camera includes the manipulating unit 40 for inputting thereto a user manipulation signal. The manipulating unit 40 may include a member for performing various setting operations when the user manipulates the digital camera or performs photographing. For example, the manipulating unit 40 may be implemented with a button, a key, a touch panel, a touch screen, a dial, or the like, and the user manipulation signal, such as power on/off, photographing start/stop, play start/stop/search, driving of an optical system, mode conversion, menu manipulation, selection, or the like, may be input to the manipulating unit 40. For example, the shutter button may be half-pressed, full-pressed, and released by the user. When the shutter button is half-pressed (S1 manipulation), a manipulation signal indicating start of focus control is output. When the half-pressed shutter button is released, the focus control is terminated. When the shutter button is full-pressed (S2 manipulation), a manipulation signal indicating start of photographing is output. The manipulation signal is transmitted to the image signal processing unit/CPU 31 to drive corresponding components.

Figure 2:
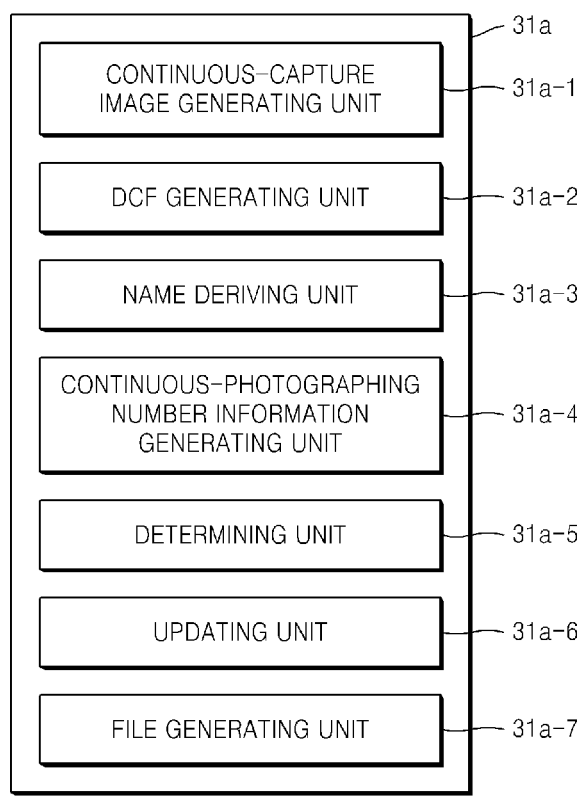
FIG. 2 is a block diagram for describing an image signal processing unit/central processing unit (CPU) in the digital camera shown in FIG. 1 according to a first embodiment of the invention.
Figure 3:
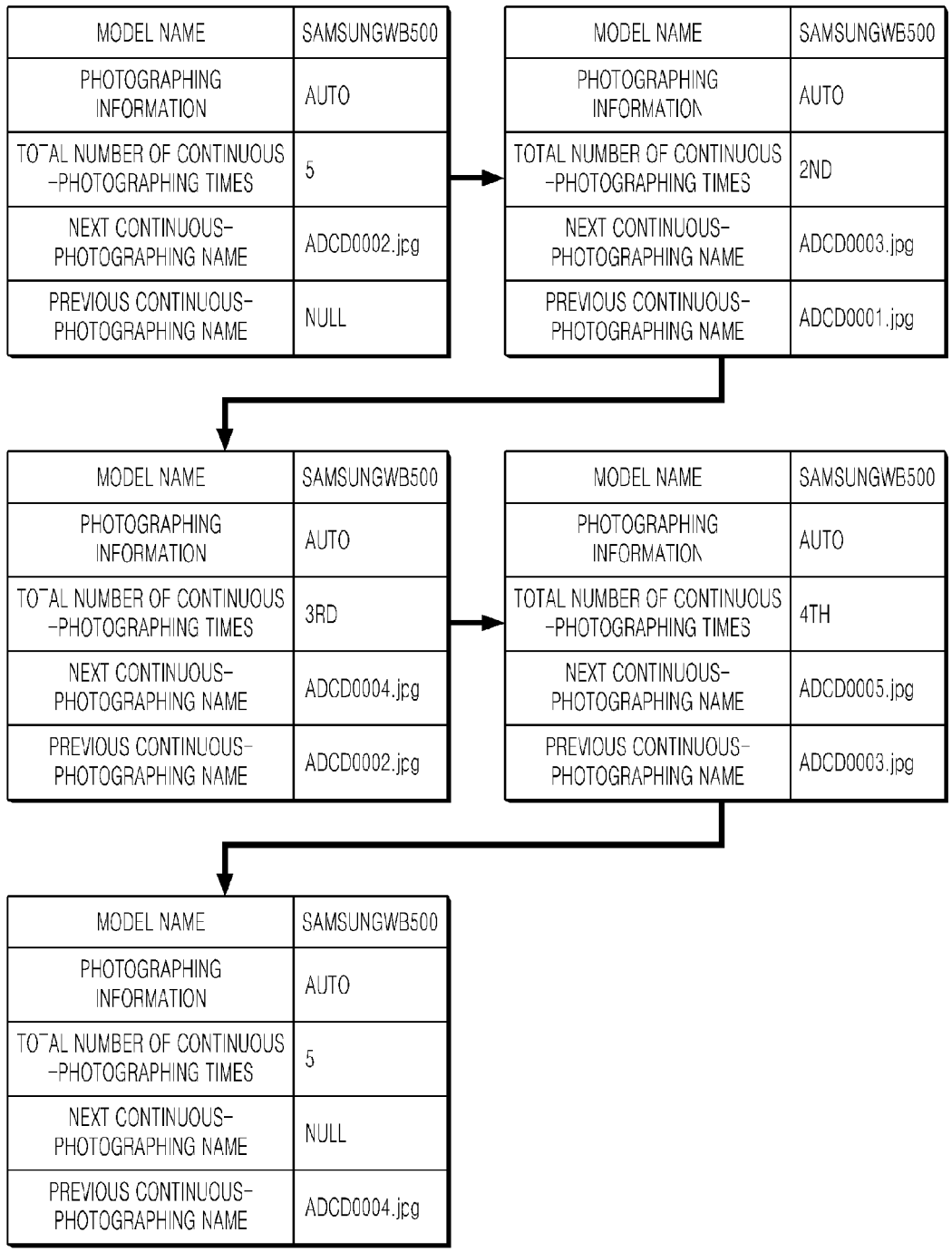
FIG. 3 is a diagram showing an example of information stored in Exif of continuously captured images in the digital camera shown in FIG. 2.

FIG. 2 is a block diagram for describing an image signal processing unit/CPU in the digital camera shown in FIG. 1 according to a first embodiment of the invention, and FIG. 3 is a diagram showing an example of information stored in Exif of continuously captured images in the digital camera shown in FIG. 2.

Referring to FIG. 2, an image signal processing unit/CPU 31*a* according to the current embodiment includes a continuous-captured image generating unit 31*a*-1 which generates continuous-captured images consecutively input at predetermined intervals by a continuous-photographing signal in a continuous-photographing mode, and a DCF generating unit 31*a*-2 which generates a first name of a first continuous-captured image and a second name of a second continuous-captured image following the first continuous-captured image according to DCF rules. The image signal processing unit/CPU 31*a* also includes a continuous-capture number information generating unit 31a-4 which generates continuous-capture number information indicating an order of continuous-photographing of the first continuous-captured image. The image signal processing unit/CPU 31a also includes a file generating unit 31a-7 which generates a first file including the first continuous-captured image, the first name thereof, the second name, and the first continuous-capture number information. The first name, the second name, and the first continuous-capture number information may be stored in an Exif field of the first file, and more specifically, the second name may be stored in a next continuous-captured image region of the Exif field.

The generated second name and first continuous-capture number information are stored in the memory (50 shown in FIG. 1).

A name deriving unit 31a-3 may be further provided to derive the stored second name of the second continuous-captured image following the first continuous-captured image when the continuous-captured image generating unit 31a-1 generates the second continuous-captured image. The continuous-capture number information generating unit 31a-4 may derive the first continuous-capture number information stored in the memory 50 and generate second continuous-capture number information indicating an order of continuous-photographing of the second continuous-captured image, by incrementing the derived continuous-capture number information by 1.

The DCF generating unit 31a-2 generates a third name of a third continuous-captured image following the second continuous-captured image according to the DCF rules, and the file generating unit 31a-7 may further generate a second file including the second continuous-captured image, the second name, the third name, and the second continuous-capture number information. The second name, the third name, and the second continuous-capture number information may be stored in an Exif field of the second file. More specifically, in the Exif region, the first name may be stored in a region of a previous continuous-captured image and the third name may be stored in a region of a next continuous-captured image.

Therefore, according to the current embodiment, continuous-photographing information regarding a previous continuous-captured image, a next continuous-captured image, a total number of continuous-photographing times may be stored in a file of a continuous-captured image for use in playback of the continuous-captured image.

In addition, the image signal processing unit/CPU 31a according to the current embodiment of the invention may further include a determining unit 31a-5 which determines whether the second continuous-captured image is the last continuous-captured image. The image signal processing unit/CPU 31a may further include an updating unit 31a-6 which updates continuous-capture number information of the first continuous-captured image with the second continuous-capture number information of the second continuous-captured image if the second continuous-captured image is the last continuous-captured image.

FIG. 3 is a diagram showing an example of information stored in Exif fields of continuous-captured images in the digital camera shown in FIG. 2. FIG. 3 illustrates an example where five continuous-captured images are obtained.

Referring to FIG. 3, when a first continuous-captured image is generated by performing first photographing, a first name ADCD0001.jpg is generated according to the DCF rules and a name of a first file including the first continuous-captured image is designated as ADCD0001.jpg. A second name ADCD0002.jpg following the first name ADC0001.jpg is generated according to the DCF rules, and then the second name ADCD0002.jpg and continuous-photographing information regarding the total number of continuous-photographing times '1' are stored in an Exif field of the first file. The Exif field includes a first region where the continuous-photographing information '1' regarding a total number of continuous-photographing times is stored, a second region where a name of a next continuous-captured image is stored, and a third region where a name of a previous continuous-captured image is stored. '1' is stored in the first region, and the second name ADC0002.jpg is stored in the second region. The third region is recorded as NULL. The first continuous-captured image is obtained by first continuous-photographing, such that there is no previous continuous-captured image and thus the third region is recorded as NULL. The determining unit (31a-5 of FIG. 1) may also determine whether a continuous-captured image is the first continuous-captured image. If the determining unit 31a-5 determines that the continuous-captured image is the first continuous-captured image, the third region of the Exif field may be recorded as NULL. In the Exif field of the first file may be further stored a model name and photographing information. The file generating unit 31a-7 may generate the first file including the above-configured Exif field and the first continuous-captured image. The first name ADCD0001.jpg, the second name ADCD0002.jpg, and continuous-photographing information '1' regarding a total number of continuous-photographing times are stored in the memory 50.

When a second continuous-captured image following the first continuous-captured image is generated, a name of the second continuous-captured image may be the second name ADCD0002.jpg generated according to the DCF rules, but the invention is not limited thereto and the second name ADCD0002.jpg stored in the memory 50 may be derived and used. The name of the second continuous-captured image is designated as the second name ADCD0002.jpg and '2' as continuous-photographing information regarding second continuous photographing is stored in the first region of the Exif field. The continuous-capture number information generating unit (31a-4 of FIG. 2) generates the continuous-photographing information '2' to be stored in a first region of the Exif field of a second file including the second continuous-captured image, by adding '1' to the currently stored continuous-capture image '1'. A next name of the second name ADCD0002.jpg, that is, a third name ADCD0003.jpg is generated according to the DCF rules, and the third name ADCD0003.jpg is stored in the second region of the Exif field. The first name ADCD0001.jpg stored in the memory 50 is derived, and the derived first name ADCD0001.jpg is stored in the third region of the Exif field which stores a name of a previous continuous-captured image. Like in case of the first file, a second file may be generated by further storing a model name and photographing information in the Exif field. The file generating unit 31a-7 may generate the second file which includes the above-configured Exif field and the second continuous-captured image.

Likewise, when a third continuous-captured image and a fourth continuous-captured image are generated by continuous photographing performed after the second continuous-captured image, each of a third file and a fourth file may be generated by storing a name of a previous continuous-captured image, a name of a next continuous-captured image, and continuous-photographing information regarding a total number of continuous photographing times are stored in an Exif field.

When a fifth continuous-captured image is generated by last continuous-photographing, a fifth name ADCD0005.jpg is generated according to the DCF rules or the fifth name ADCD0005.jpg stored in the memory 50 is derived and used. In a first region of an Exif field of a fifth file including the fifth continuous-captured image, '5' is stored as continuous-photographing information regarding fifth continuous-photographing. The continuous-photographing information '5' regarding fifth continuous-photographing is obtained by adding '1' to continuous-photographing information '4' regarding a currently stored continuous-photographing number. The determining unit (31$a$-5 of FIG. 1) determines whether the fifth continuous-captured image is the last continuous-captured image. If so, the continuous-photographing information regarding a total number of continuous-photographing times is determined as '5', and the updating unit (31$a$-6 of FIG. 1) updates the continuous-photographing information regarding the total number of continuous-photographing times of the first file with 5. More specifically, before generation of the fifth continuous-captured image, '1' is stored as the continuous-photographing information regarding the total number of continuous-photographing times of the first file. When the fifth continuous-captured image is generated by the last continuous-photographing, the continuous-photographing information regarding the total number of continuous-photographing times of the first file is updated with '5'. Thus, information regarding a total number of continuous-photographing times can be checked from the Exif field of the first file. If the fifth continuous-captured image is the last continuous-captured image, the second region of the Exif field of the fifth file is recorded as NULL because there is no next continuous-captured image. The fourth name ADCD0004.jpg stored in the memory 50 is derived and then stored in the third region of the Exif region which stores a name of the previous continuous-captured image. Like in the first file, the fifth file may be generated by further storing a model name and photographing information in the Exif field. The file generating unit 31$a$-7 may generate the fifth file including the above-configured Exif and the fifth continuous-captured image.

Figure 4:
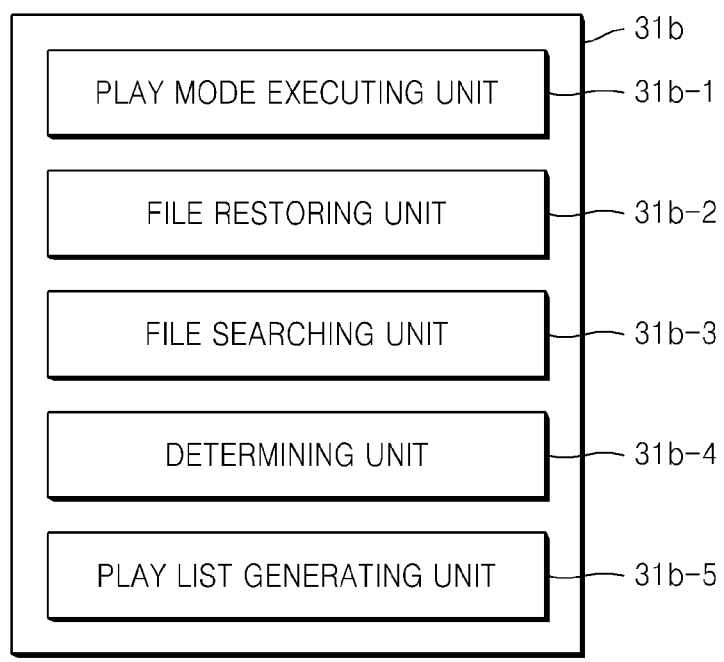
FIG. 4 is a block diagram for describing an image signal processing unit/CPU in the digital camera shown in FIG. 1 according to a second embodiment of the invention.

FIG. 4 is a block diagram for describing an image signal processing unit/CPU 31$b$ in the digital camera shown in FIG. 1 according to a second embodiment of the invention. The image signal processing unit/CPU 31$b$ shown in FIG. 4 is intended to play back the first through fifth files generated by the image signal processing unit/CPU 31$a$ shown in FIG. 2. The current embodiment will be described on the assumption that files generated by the image signal processing unit/CPU 31$a$ are stored in the memory card (60 of FIG. 1) or/and the memory (50 of FIG. 1), but the invention is not limited thereto and the image signal processing unit/CPU 31$b$ shown in FIG. 4 may also include components of the image signal processing unit/CPU 31$a$ shown in FIG. 2.

Referring to FIG. 4, the image signal processing unit/CPU 31$b$ includes a play mode executing unit 31$b$-1 which executes a play mode for a continuous-captured image (or a continuous-photographing play mode), a file restoring unit 31$b$-2 which derives a second name for a next continuous-captured image following the first continuous-captured image from a first file, and a file searching unit 31$b$-3 which searches for a second file corresponding to the second name. The display unit (70 of FIG. 1) then plays back a second continuous-captured image included in the second file.

The play mode executing unit 31$b$-1 may execute a continuous-photographing play mode if a total number of continuous-photographing times of the first file or a file including a representative continuous-captured image is plural. The continuous-photographing play mode may also be executed by user's manipulation. When the continuous-photographing play mode is executed, a play list generating unit 31$b$-5 deletes file names for continuous-captured images except for a file name for the first continuous-captured image or a file name for the representative continuous-captured image from a play list for the normal play mode, by using continuous-photographing information regarding a total number of continuous-photographing times stored in the file including the first continuous-captured image. Thus, playback of continuous-captured images are executed in special cases such as when the user desires to do so, and after playback of only the first continuous-captured image or the representative continuous-captured image, playback of images normally captured before or after continuous-photographing may be performed. This is because continuous-captured images can be played back by using continuous-photographing information stored in files including the continuous-captured images, without a need to generate a separate play list for the continuous-captured images.

When the continuous-photographing play mode is executed, an on-screen-display (OSD) indicating a total number of continuous-photographing times may be displayed on the display unit (70 of FIG. 1). A first continuous-captured image included in a first file is played back, a name of a next continuous-captured image stored in an Exif field of the first file is derived, and a second continuous-captured image included in a second file, which is the next continuous-captured image, is played back. Thus, according to the current embodiment, instead of playing back images complying with the DCF rules according to separate play lists generated for the images like in the normal play mode, a next continuous-captured image can be consecutively played back by referring to a name of the next continuous-captured image stored in an Exif field of a file. In other words, the first file is restored and the first continuous-captured image is played back, and then naturally, a name of a next continuous-captured image, a second continuous-captured image, may be derived from the first file, and a second file corresponding to a name of the second continuous-captured image, i.e., corresponding to the second name ADCD0002.jpg is searched, after which the found second file is restored and the second continuous-captured image is consecutively played back.

The image signal processing unit/CPU 31$b$ may further include a determining unit 31$b$-4 which determines whether the second continuous-captured image is the last continuous-captured image. If the second continuous-captured image is the last continuous-captured image, the play mode executing unit 31$b$-1 may execute the normal play mode which performs playback according to a play list. The play list generating unit 31$b$-5 may generate a new play list by deleting file names for continuous-captured images except for a file name for a representative continuous-captured image from among file names of files complying with the DCF rules, and the normal play mode may be executed according to the generated new play list. The play list for the normal play mode may be newly generated when a continuous-captured image is played back. For example, when the fifth continuous-captured image of the fifth file, which is the last continuous-captured image, is played back, the continuous-photographing play mode is terminated and then the normal play mode is executed. Thus, the continuous-captured image can be played back according to the play list generated for execution of the normal play mode.

The determining unit 31$b$-4 may be in common with the determining unit 31$a$-5 of the image signal processing unit/CPU 31$a$ shown in FIG. 2.

Figure 5:
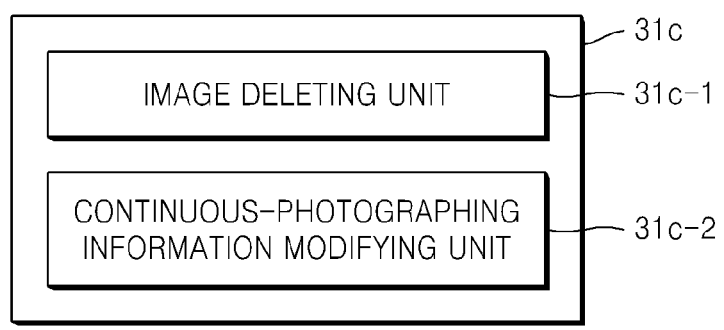
FIG. 5 is a block diagram for describing an image signal processing unit/CPU in the digital camera shown in FIG. 1 according to a third embodiment of the invention.

FIG. 5 is a block diagram for describing an image signal processing unit/CPU 31$c$ in the digital camera shown in FIG. 1 according to a third embodiment of the invention. In the current embodiment, a description will be made of the image signal processing unit/CPU 31c which deletes continuous-captured images. Like in FIG. 4, the current embodiment assumes that files generated by the image signal processing unit/CPU 31a shown in FIG. 2 are stored in the memory card (60 of FIG. 1) and/or the memory (50 of FIG. 1), but the invention is not limited thereto and the image signal processing unit/CPU 31c may also include components of the image signal processing unit/CPU 31a shown in FIG. 2 and/or components of the image signal processing unit/CPU 31b shown in FIG. 4.

Referring to FIG. 5, the image signal processing unit/CPU 31c includes an image deleting unit 31c-1 and a continuous-photographing information modifying unit 31c-2. The image deleting unit 31c-1 deletes a continuous-captured image. The continuous-photographing information modifying unit 31c-2 updates, with a name of a previous continuous-captured image with respect to the deleted continuous-captured image, a region of a file including a next continuous-captured image used to store the name of the previous continuous-captured image, modifies a region of a file including the previous-captured image, used to store the name of the next continuous-captured image, into the name of the next continuous-captured image, and modifies continuous-photographing information for the first continuous-captured image by reducing the continuous-photographing information by 1.

Figure 6:
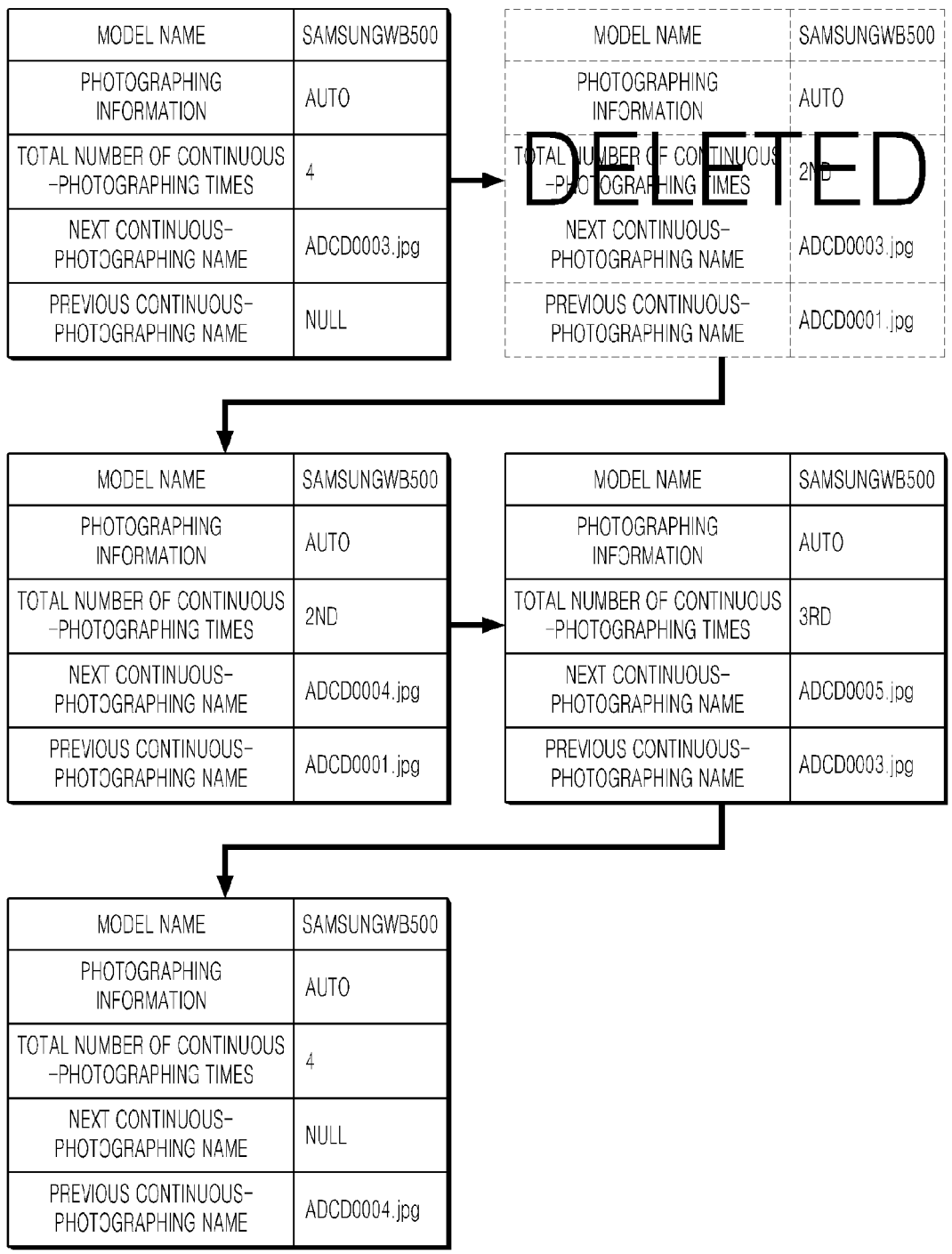
FIG. 6 is a diagram showing an example of information stored in Exif of continuously captured images in the digital camera shown in FIG. 5.

FIG. 6 which is a diagram showing an example where a second file including a second continuous-captured image is deleted. When the second file including the second continuous-captured image is deleted, the continuous-photographing information modifying unit 31c-2 modifies Exif fields of a first file including the first continuous-captured image which is a previous continuous-captured image with respect to the second continuous-captured image and a third file including a third continuous-captured image which is a next continuous-captured image with respect to the second continuous-captured image. More specifically, in the Exif field of the first file, information stored in the second region used to store the name of the next continuous-captured image is modified. In other words, as the second file is deleted, a name of the second file, a second name ADCD0002.jpg is deleted and modification is performed into a name of a third file which is a next file with respect to the second file, that is, a third name ADCD0003.jpg. Then, in the Exif field of the third file which is the next file with respect to the second file, a third region used to store a name of a previous file is modified. In other words, as the second file is deleted, the name of the second file, the second name ADCD0002.jpg is deleted and modification is performed into the name of the third file which is the next file with respect to the second file, the third name ADCD0003.jpg. Continuous-photographing information regarding a total number of continuous-photographing times for the first file and the third through fifth files is modified by reducing current continuous-photographing information by 1.

According to the current embodiment of the invention, by modifying continuous-photographing information as a continuous-captured image is deleted, an error can be prevented from occurring in playback of a subsequent continuous-captured image.

Figure 7:
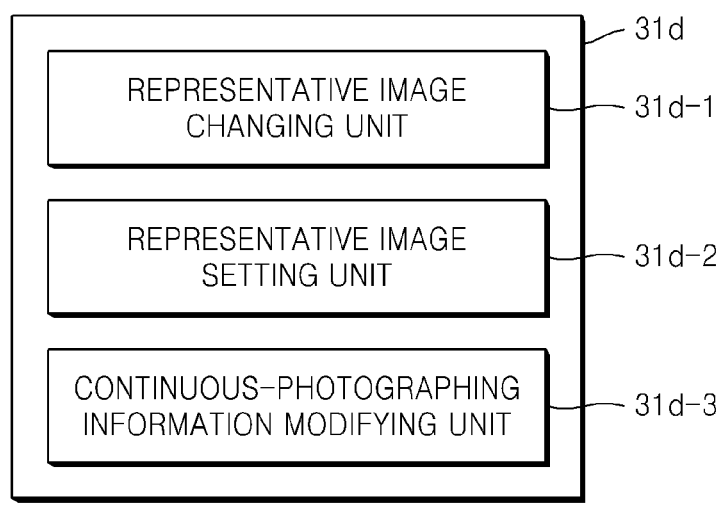
FIG. 7 is a block diagram for describing an image signal processing unit/CPU in the digital camera shown in FIG. 1 according to a fourth embodiment of the invention.

FIG. 7 is a block diagram for describing an image signal processing unit/CPU in the digital camera shown in FIG. 1 according to a fourth embodiment of the invention. In the current embodiment, an image signal processing unit/CPU 31d which changes a representative continuous-captured image will be described. As in FIG. 4, the current embodiment assumes that files generated by the image signal processing/CPU 31a shown in FIG. 2 are stored in the memory card (60 of FIG. 1) or/and the memory (50 of FIG. 1), but the invention is not limited thereto and the image signal processing unit/CPU 31d may also include components of the image signal processing unit/CPU 31b shown in FIG. 4 and/or the image signal processing unit/CPU 31c shown in FIG. 5.

Referring to FIG. 7, the image signal processing unit/CPU 31d includes a representative image changing unit 31d-1, a representative image setting unit 31d-2, and a continuous-photographing modifying unit 31d-3. The representative image changing unit 31d-1 changes or deletes a first representative image. The representative image setting unit 31d-2 sets another continuous-captured image as a second representative image if the first representative image is changed or deleted. The continuous-photographing information modifying unit 31d-3 modifies continuous-photographing information of the first representative image into continuous-photographing information of the second representative image in case of representative image change, and modifies the continuous-photographing information of the second representative image by subtracting 1 from the continuous-photographing information of the first representative image in case of representative image deletion.

The continuous-photographing information modifying unit 31d-3 may modify a region for storing a name of a previous continuous-captured image or a region for storing a name of a next continuous-captured image in an Exif field of a file including the second representative image into a name of a previous continuous-captured image or a name of a next continuous-captured image stored in an Exif region of a file including the first representative image.

The change or deletion of a representative image may be performed by the user through the manipulating unit (40 of FIG. 1). Needless to say, the change of deletion of a representative image may also be automatically performed by a predetermined algorithm.

Figure 8:
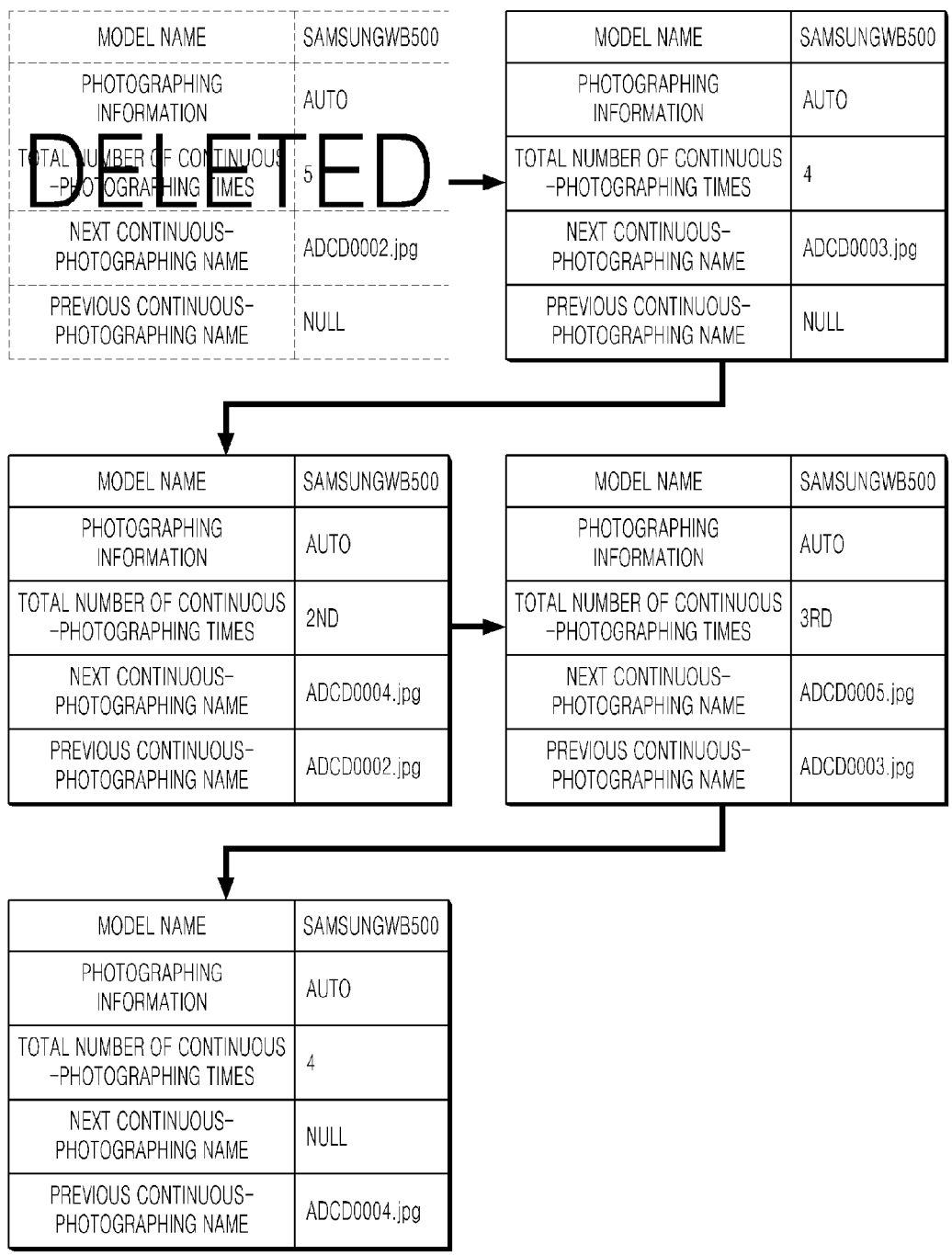
FIG. 8 is a diagram showing an example of information stored in Exif of continuously captured images in the digital camera shown in FIG. 7.

The change of deletion of a representative image will be described in detail with reference to FIG. 8. Referring to FIG. 8, when a first continuous-captured image of a first file is set to a first representative image, the first representative image is deleted and a second continuous-captured image of a second file is set to a second representative image. In this case, information stored in an Exif field of the second file is modified. Thus, '4', which is obtained by subtracting '1' from continuous-photographing information '5' regarding a total number of continuous-photographing times stored in a first region of the Exif field of the first file, is stored in a first region of the Exif field of the second file. The example shown in FIG. 8 corresponds to a case where a representative image is deleted, but in case of change of a representative image, the continuous-photographing information '5' stored in the first region of the Exif field of the first file may be stored in the first region of the Exif field of the second file.

A name of a previous continuous-captured image stored in a third region of the Exif field of the second file is modified into NULL stored in a third region of the Exif field of the first file. This is because a previous file with respect to the second file disappears due to deletion of the first file. Continuous-photographing information regarding a total number of continuous-photographing times for each of the third through fifth files is sequentially subtracted by 1. This process may correspond to the above-described deletion of a continuous-captured image.

Figure 9:
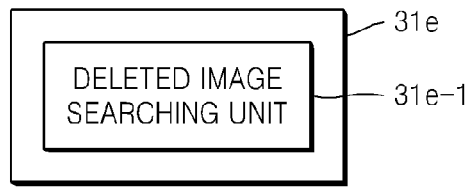
FIG. 9 is a block diagram for describing an image signal processing unit/CPU in the digital camera shown in FIG. 1 according to a fifth embodiment of the invention.

FIG. 9 is a block diagram for describing an image signal processing unit/CPU in the digital camera shown in FIG. 1 according to a fifth embodiment of the invention. In the current embodiment, a description will be made of an image signal processing unit/CPU 31e which searches for a continuous-captured image deleted from among continuous-captured images. Like in FIG. 4, the current embodiment also assumes that files generated by the image signal processing unit/CPU 31a shown in FIG. 2 are stored in the memory card (60 of FIG. 1) or/and the memory (50 of FIG. 1), but the invention is not limited thereto and the image signal processing unit/CPU 31e may also include components of the image signal processing unit/CPU 31b shown in FIG. 4, and/or components of the image signal processing unit/CPU 31C shown in FIG. 5, and/or components of the image signal processing unit/CPU 31d shown in FIG. 7.

When power is supplied after power is interrupted by the user, the play list generating unit 31b-5 described with reference to FIG. 4 has to generate a play list which is lost due to power interruption. In this case, in the invention, a play list for the normal play mode and a play list for the continuous-photographing play mode are not separately generated. Instead, upon start of playback of a continuous-captured image, continuous-captured images except for a representative image are deleted from the play list for the normal play mode for convenience of playback in the normal play mode, thus reorganizing the play list only with normally captured images. When a first continuous-captured image is played back, the play list may be modified as described above. More specifically, the play list may be modified in case of playback of the first continuous-captured image on a screen, thumbnail playback, or slide-show playback.

When the first continuous-captured image is played back and thus the continuous-photographing play mode is executed, header information of a first file including the first continuous-captured image is read to collect information about a file to be played back. The play list generating unit 31b-5 then obtains continuous-photographing related information from an Exif field of the first file. If the play list generating unit 31b-5 determines that the current file to be played back is a file generated by continuous-photographing, the play list generating unit 31b-5 deletes images generated by continuous-photographing from the first read image (for example, a header or tail of a continuous-captured image) from the play list, thus updating the play list.

However, this operation is assumed that there is no external factor, and if change to continuous-captured images occurs due to an external factor such as user's deletion of some of continuous-captured images from a device capable of reading a storage medium like a personal computer (PC), detection of change and/or deletion of a continuous-captured image are necessary. As mentioned above, by the digital image signal processing apparatus according to the invention, continuous-photographing information in an Exif field of a file is modified in case of change and/or deletion of a continuous-captured image, but if the continuous-captured image is changed and/or deleted in an external device, it is necessary to search for a deleted continuous-captured image and modify continuous-photographing information or update a play list.

As to change of a continuous-captured image, a description will be made with reference to FIG. 9.

Deletion of a continuous-captured image in an external device may include 1) deletion of a continuous-captured image in a mid region between a header and a tail, 2) deletion of a continuous-captured image of the header, 3) deletion of a continuous-captured image of the tail, and 4) deletion of both the continuous-captured image of the header and the continuous-captured image of the tail.

In case 1), the image signal processing unit/CPU 31e may include a deleted-image searching unit 31e-1 which searches for a continuous-captured image of a predetermined order from the last continuous-captured image or the first continuous-captured image and compares continuous-photographing number information indicating an order of continuous-photographing of the continuous-captured image of the predetermined order with the predetermined order, to derive the deleted continuous-captured image from among continuous-captured images preceding or following the continuous-captured image of the predetermined order if the continuous-photographing number information does not match the predetermined order.

The image signal processing unit/CPU 31e may further include a play list generating unit (31b-5 shown in FIG. 4) which generates a play list in which a file including the found continuous-captured image is deleted or a continuous-photographing information modifying unit (31c-2 shown in FIG. 5) which modifies information stored in an Exif field of another file as the continuous-captured image is deleted.

In an embodiment, upon playback of a first continuous-captured image, a deleted continuous-captured image may be searched for based on information stored in an Exif field of a first file. From a name of the first file including the first continuous-captured image and continuous-photographing information regarding a total number of continuous-photographing times stored in the Exif field of the first file, a name of a fifth file including the last continuous-captured image can be predicted. The name of the fifth file may be derived by adding (total number of continuous-photographing times−1) to the name of the first file. By referring to an Exif field of the predicted fifth file, it can be determined whether the current continuous-captured image is the last continuous-captured image. If the current continuous-captured image is the last continuous-captured image, an Exif field of a file including a continuous-captured image existing in the mid region is checked. If a name of the file expected to exist in the mid region exists in the Exif field and an order of the file matches continuous-photographing information, it can be seen that a position of the deleted file exists between the mid region and the first file. By repetitively performing the foregoing operation, a file including a deleted continuous-captured image is searched for and the found file is deleted by the play list generating unit 31e-2, thus generating a new play list.

When 13 files including continuous-captured images are stored as shown in Table 1, a file 13 including the last continuous-captured image is searched for from a file 1 including the first continuous-captured image and the 13 files are divided into a first front region and a second rear region with respect to a file 9. Since the file 9 is in a (−4) position from the file 13, it can be determined that there is a deleted continuous-captured image in the first front region. The first front region is also divided into a second front region and a second rear region with respect to a file 4 in a mid region. Since the file 4 is not in a (−4) position from the file 9 including the last continuous-captured image of the first front region, it can be seen that a file is deleted in the second rear region. By repeating this operation, it can be seen that a file 5 is deleted.

TABLE 1

| | File No. | | | | | | | | | | | |
|---|---|---|---|---|---|---|---|---|---|---|---|---|
| | 1 | 2 | 3 | 4 | 6 | 7 | 8 | 9 | 10 | 11 | 12 | 13 |
| File Name | ABCD 0001.jpeg | ABCD 0002.jpeg | ABCD 0003.jpeg | ABCD 0004.jpeg | ABCD 0006.Jpeg | ABCD 0007.jpeg | ABCD 0008.jpeg | ABCD 0009.jpeg | ABCD 0010.jpeg | ABCD 0011.jpeg | ABCD 0012.jpeg | ABCD 0013.Jpeg |

If the fifth file including the deleted continuous-captured image is found, the continuous-photographing information modifying unit 31c-2 modifies continuous-photographing information regarding a total number of continuous-photographing times for files 1 through 4 and files 6 through 13 by sequentially subtracting the continuous-photographing information for each file by 1, and modifies information in Exif fields of the file 4 and the file 6. This process is similar to modification of information stored in an Exif field in case of deletion of a continuous-captured image.

In case 2), the image signal processing unit/CPU 31e may further include the play list generating unit 31b-5 which searches for a continuous-captured image after a predetermined interval from a currently played continuous-captured image to derive the last continuous-captured image, and determines whether the first continuous-captured image is deleted from continuous-photographing number information indicating an order of continuous-photographing of the last continuous-captured image. The image signal processing unit/CPU 31e may also include the play list generating unit 31b-5 which generates a play list by deleting a file including the found continuous-captured image. The image signal processing unit/CPU 31e may also include the continuous-photographing information modifying unit 31c-2 which when a header file of the first continuous-captured image is deleted, sets a next continuous-captured image following the first continuous-captured image as a new first continuous-captured image and modifies information stored in an Exif field of the next continuous-captured image to correspond to the new first continuous-captured image.

Figure 10:
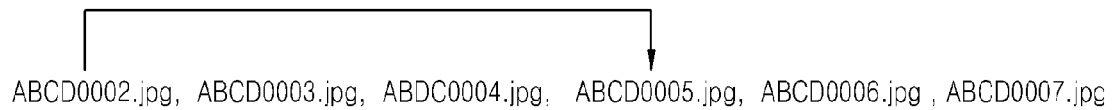
FIGS. 10 through 12 are conceptual diagrams for describing an operation of searching for a deleted image when the continuously captured image is deleted from outside.
Figure 11:
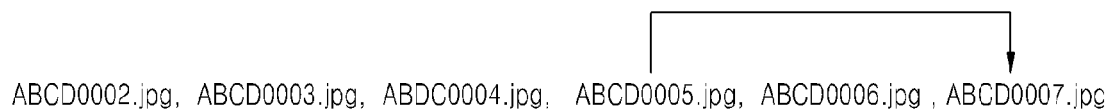
Figure 12:

In an embodiment of the invention, when a header file including the first continuous-captured image is deleted, it can be seen that a file to be currently played back has been generated by continuous-photographing during the normal play mode. However, a total number of continuous-photographing times cannot be known because the header file is deleted. In this case, the deleted image searching unit 31e-1 tries to know a total number of continuous-photographing times by referring to an order of continuous-photographing of the currently played file, which is recorded in the currently played file. More specifically, if the first file ABCD0001.jpeg is deleted in an external device, it can be seen that the second file ABCD0002.jpeg is a continuous-captured image file at the time of playback of the second file, from information stored in an Exif field. By referring to continuous-photographing information regarding a total number of continuous-photographing times stored in the currently played file, an expected continuous-photographing range is estimated. If the currently played file is not a header or tail file, continuous-photographing information regarding an order of a continuous-captured image is stored in the Exif field. If the continuous-photographing information indicates an order less than fifth, an Exif field of a file skipped by 3 orders (as shown in FIG. 10) is read; if the continuous-photographing information indicates an order more than fifth, an Exif field of a file skipped by 2 orders (as shown in FIG. 11) is read. If the found file with skip does not include a continuous-captured image, movement to a previous file is made one by one (as shown in FIG. 12) to search for a tail file. Once the tail file is found in this way, a total number of continuous-captured images can be known and the play list generating unit 31e-2 can generate a play list by using the number of continuous-captured images.

In case 3), the image signal processing unit/CPU 31e may further include the deleted image searching unit 31e-1 which determines whether the last continuous-captured image has been deleted from continuous-photographing number information of the first continuous-captured image. The image signal processing unit/CPU 31e may also include the play list generating unit (31b-5 shown in FIG. 4) which generates a play list in which a file including the found continuous-captured image has been deleted, and/or the continuous-photographing information modifying unit (31c-2 shown in FIG. 5) which sets a previous continuous-captured image preceding the last continuous-captured image as a new last continuous-captured image and modifies information stored in an Exif field of the previous continuous-captured image to correspond to the new last continuous-captured image.

In case 4), the deleted image searching unit 31e-1 confirms that a tail file and a header file have been deleted as in case 2), and the play list generating unit (31b-5 shown in FIG. 4) generates a play list in which a file including the found continuous-captured image has been deleted and/or the continuous-photographing information modifying unit (31c-2 shown in FIG. 5) modifies continuous-photographing related information in an Exif field of a second file following the header file and modifies continuous-photographing related information in an Exif field of a previous file preceding the tail file.

Hereinafter, a digital image signal processing method according to the invention will be described in detail with reference to the accompanying drawings.

Figure 13:
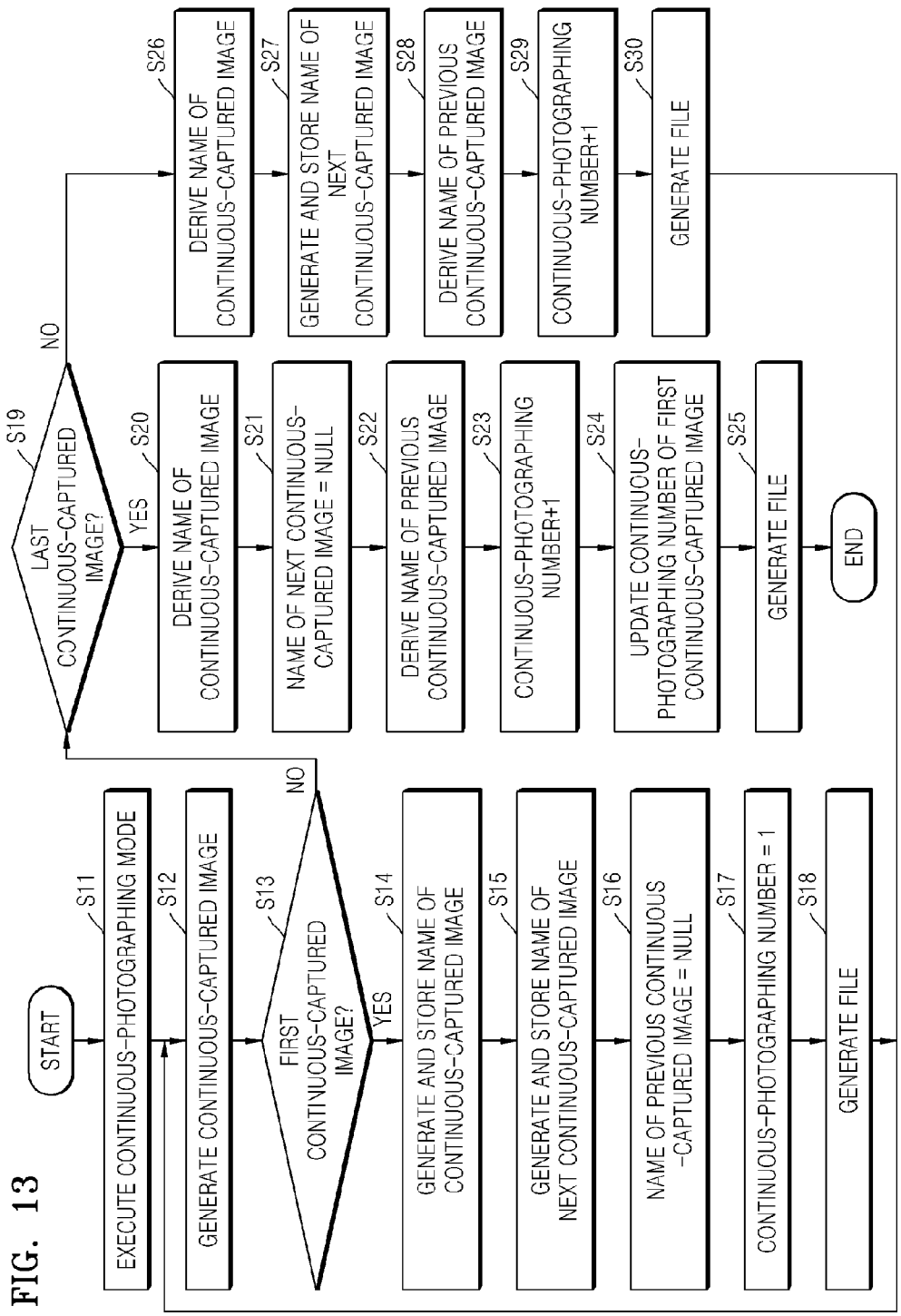
FIG. 13 is a flowchart of a digital image signal processing method according to a first embodiment of the invention.

FIG. 13 is a flowchart of a digital image signal processing method according to a first embodiment of the invention.

Referring to FIG. 13, a continuous-photographing mode is executed in operation S11, and a continuous-captured image is generated in operation S12.

It is determined whether the generated continuous-captured image is a first continuous-captured image in operation S13.

If the generated continuous-captured image is the first continuous-captured image, a name of the continuous-captured image is generated according to the DCF rules and then stored in a memory in operation S14.

A name of a next continuous-captured image is generated according to the DCF rules and then stored in the memory in operation S15.

A name of a previous continuous-captured image is designated as NULL in operation S16, and continuous-photographing information regarding a total number of continuous-photographing times is set to '1' in operation S17.

A file including the first continuous-captured image, the name of the next continuous-captured image, the name of the previous continuous-captured image, and the continuous-photographing information regarding a total number of continuous-photographing times is generated in operation S18.

If the generated continuous-captured image is not the first continuous-captured image in operation S13, it is determined whether the generated continuous-captured image is a last continuous-captured image in operation S19.

If the generated continuous-captured image is the last continuous-captured image, a name of the generated continuous-captured image is derived in operation S20. The name of the generated continuous-captured image may be derived from names previously stored in the memory. However, the invention is not limited thereto and the name of the generated continuous-captured image may also be generated according to the DCF rules.

The name of the next continuous-captured image is designated as NULL in operation S21. This is because there is no next continuous-captured image after the last continuous-captured image.

In operation S22, the name of the previous continuous-captured image may be derived from names previously stored in the memory.

In operation S23, continuous-photographing information about a total number of continuous-photographing times for the generated continuous-captured image is generated by adding 1 to continuous-photographing information for the previous continuous-captured image stored in the memory.

In operation S24, continuous-photographing information about a total number of continuous-photographing times for the first continuous-captured image is updated with the continuous-photographing information about a total number of continuous-photographing times for the last continuous-captured image.

In operation S25, a file including the last continuous-captured image, the name of the previous continuous-captured image, the name of the next continuous-captured image, and the continuous-photographing information regarding a total number of continuous-photographing times is generated. Thus, by generating a file including the last continuous-captured image, continuous-photographing may be terminated.

If the continuous-captured image generated in operation S19 is not the last continuous-captured image, the name of the generated continuous-captured image is derived from names previously stored in the memory in operation S26. However, the invention is not limited thereto and the name of the generated continuous-captured image may be generated according to the DCF rules.

In operation S27, the name of the next continuous-captured image is generated from the derived name of the generated continuous-captured image according to the DCF rules, and the generated name of the next continuous-captured image is stored in the memory.

The name of the previous continuous-captured image is derived from the memory in operation S28.

In operation S29, the continuous-photographing information regarding a total number of continuous-photographing times is generated by adding 1 to a total number of continuous-photographing times previously stored in the memory.

In operation S30, a file including the generated continuous-captured image, the name of the previous continuous-captured image, the name of the next continuous-captured image, and the total number of continuous-photographing times is generated.

Then a new next continuous-captured image is generated in operation S12, and subsequent operations are repeated.

Figure 14:
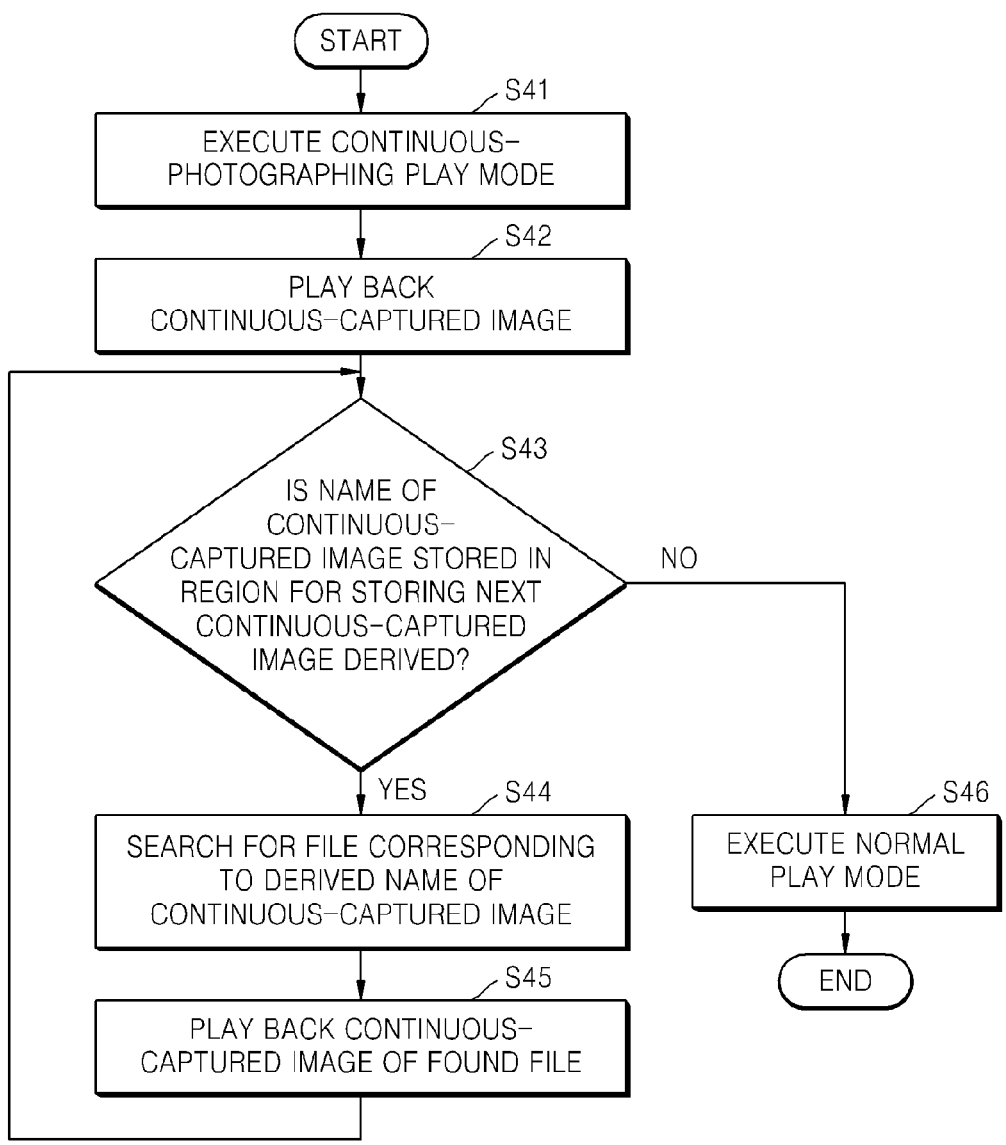
FIG. 14 is a flowchart of a digital image signal processing method according to a second embodiment of the invention.

FIG. 14 is a flowchart of a digital image signal processing method according to a second embodiment of the invention.

In the current embodiment, operations for playback in case of generation of continuous-captured files according to FIG. 13 will be described.

Referring to FIG. 14, a continuous-photographing play mode is executed in operation S41. The continuous-photographing play mode may be executed by a user through a manipulating unit, but the invention is not limited thereto and in case of playback of a file including a continuous-captured image, the continuous-photographing play mode may be executed from continuous-photographing information stored in an Exif field of the file.

A current continuous-captured image is played back in operation S42.

It is determined whether a name of the current continuous-captured image stored in a region of a next continuous-captured image can be derived in operation S43. If the current continuous-captured image is the last continuous-captured image, there is no name of the next continuous-captured image and thus the current continuous-captured image is executed in the normal play mode in operation S46. Although the determination of the last continuous-captured image is made by determining whether the name of the next continuous-captured image can be derived in the current embodiment, the invention is not limited thereto and the determination can be made by using various information such as continuous-photographing information regarding a total number of continuous-photographing times.

A file corresponding to the name of the continuous-captured image derived in operation S43 is searched for in operation S44.

The continuous-captured image of the found file is played back in operation S45.

Thereafter, the method goes back to operation S43 to determine whether the current continuous-captured image is the last continuous-captured image.

According to the current embodiment, a continuous-captured image can be played back by using an Exif field of a file generated by continuous-photographing, without separately generating a play list for a play mode of a continuous-captured image.

To execute the normal play mode after playback of files of continuous-captured images, a play list for the normal play mode in which file names for continuous-captured images except for a file name for a representative continuous-captured image are deleted may be generated. Then in operation S46, the normal play mode may be executed according to the play list.

Figure 15:
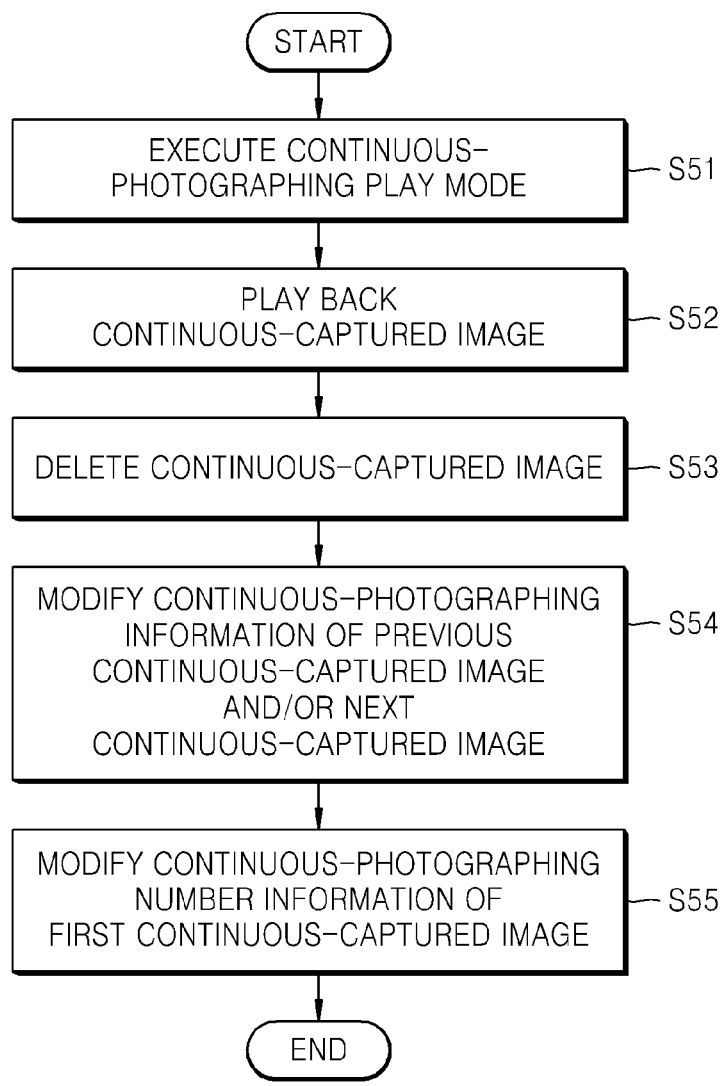
FIG. 15 is a flowchart of a digital image signal processing method according to a third embodiment of the invention.

FIG. 15 is a flowchart of a digital image signal processing method according to a third embodiment of the invention. In the current embodiment of the invention, operations for modifying information stored in an Exif field of a file including a continuous-captured image in case of deletion of the continuous-captured image will be described.

Referring to FIG. 15, a continuous-photographing play mode is executed in operation S51.

A current continuous-captured image is played back in operation S52. The playback of the continuous-captured image may be performed by the method illustrated in FIG. 14.

In operation S53, the current continuous-captured image may be deleted by user's manipulation or automatically. The deletion of the current continuous-captured image may include deleting a file including the current continuous-captured image.

In operation S54, a name of a next continuous-captured image, stored in an Exif field of a previous file preceding the deleted file, is modified into a name of a next continuous-captured image, stored in an Exif field of the deleted file. A name of a previous continuous-captured image, stored in an Exif field of a next continuous-captured image following the deleted file, is modified into a name of a previous continuous-captured image, stored in the Exif field of the deleted file.

In operation S55, continuous-photographing information for the first continuous-captured image is subtracted by 1. In addition, continuous-photographing information stored in Exif fields of files including other continuous-captured images is subtracted by 1.

Figure 16:
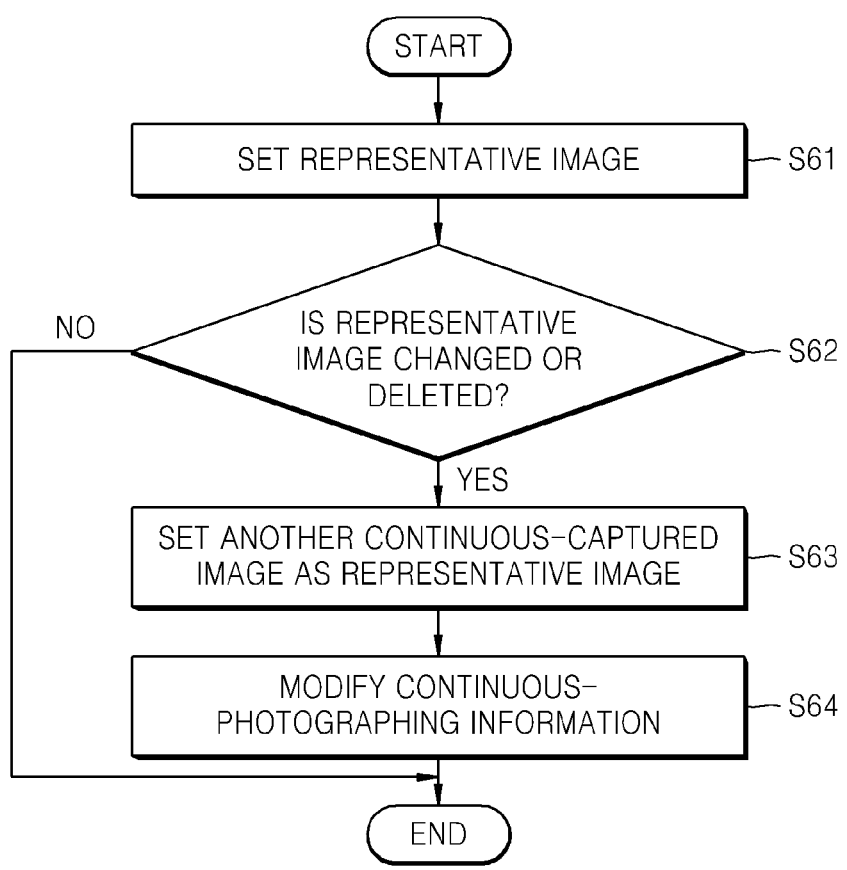
FIG. 16 is a flowchart of a digital image signal processing method according to a fourth embodiment of the invention.

FIG. 16 is a flowchart of a digital image signal processing method according to a fourth embodiment of the invention. In the current embodiment, operations for setting and changing/deleting a representative image will be described.

Referring to FIG. 16, a representative image is set in operation S61.

In operation S62, it is determined whether to change or delete the representative image by user's manipulation or automatically according to a predetermined algorithm.

Another continuous-captured image to be set as a new representative image is set as a representative image in operation S63.

In operation S64, continuous-photographing information regarding a total number of continuous-photographing times, stored in an Exif field of a file including the new representative image is modified into continuous-photographing information regarding a total number of continuous-photographing times, stored in an Exif field of a file including the previous representative image. In case of deletion, continuous-photographing information may be modified as described with reference to FIG. 15.

Although not shown in the drawings, the operations described in FIGS. 9 through 12 for deriving a deleted continuous-captured image in case of deletion of the continuous-captured image in an external device may be included in the digital image signal processing method according to the invention.

As can be anticipated from the foregoing description, when a file including a continuous-captured image is generated, continuous-photographing information is stored in an Exif field of the file, thereby allowing a device capable of recognizing a file name complying with the DCF rules to effectively play back the continuous-captured image.

More specifically, in the continuous-photographing play mode, a continuous-captured image can be played back by using the continuous-photographing information, without a need to separately generate a play list for a file including the continuous-captured image. Moreover, by generating a play list in which file names of continuous-captured images except for an unwanted image are deleted, playback of images captured before or after continuous-photographing can be easily checked.

The invention provides an image signal processing method and apparatus, in which playback is possible in any device to which DCF rules are applied and a continuous-photographing play mode and a normal play mode can be effectively executed.

The digital image signal processing apparatus according to the invention may include a processor, a memory for storing and executing program data, a permanent storage such as a disk drive, a communication port for communicating with an external device, and a user interface unit, such as a touch panel, a key, or a button.

Methods implemented with a software module or algorithm may be stored as computer-readable codes or program commands, which can be executed on the processor, on a computer-readable recording medium, etc. Examples of the computer-readable recording medium may include magnetic storage media such as read-only memory (ROM), random access memory (RAM), floppy disks, and hard disks, and optical data storage devices such as CD-ROMs and digital versatile discs (DVD). The computer-readable recording medium can also be distributed over a network of coupled computer systems so that the computer-readable code is stored and executed in a decentralized fashion. The code can be read by the computer, stored in the memory, and executed on the processor.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented with an algorithm executed in one or more processors. Furthermore, the invention could employ conventional techniques for electronics configuration, signal processing and/or control, data processing, and the like. Terms such as "mechanism", "element", "means", "component", etc., may be used in a broad sense, and are not limited to mechanical and physical components. The terms may include a meaning of a series of routines of software in connection with a processor or the like.

The particular implementations shown and described herein are illustrative examples of the invention and are not intended to otherwise limit the scope of the invention in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

In the specification (particularly in the claims) of the invention, the use of the term "the" and its similar indicative terms may correspond to both singular and plural. When a range is stated in the invention, it covers the invention where an individual value included in that range is applied (unless stated otherwise), and such statement is equivalent to statement of each individual value forming the range in the detailed description of the invention. Unless the order of steps forming the method according to the invention are explicitly stated or stated otherwise, those steps may be performed in any appropriate order. The stated order of the steps does not necessarily limit the invention. In the invention, the use of any example or exemplary term (for example, "and so forth") is merely intended to describe the invention in detail, and thus unless defined by the claims, the scope of the invention is not limited by the example or exemplary term. In addition, it can be understood by those of ordinary skill in the art that various modifications, combinations, and changes can be made according to design conditions and factors within the scope of claims and equivalents thereof.

What is claimed is:

1. A digital image signal processing method comprising:
   generating a first continuous-captured image in a continuous-photographing mode;
   generating a first name of the first continuous-captured image according to Design Rule for Camera File Systems (DCF) rules, and storing the first name;
   generating a second name for a second continuous-captured image following the first continuous-captured image according to the DCF rules, and storing the second name;
   generating first continuous-photographing number information indicating an order of continuous-photographing of the first continuous-captured image, and storing the first continuous-photographing number information;
   generating a first file having the first name, the first file comprising the first continuous-captured image, the second name, and the first continuous-photographing number information;
   generating the second continuous-captured image following the first continuous-captured image;
   deriving the stored second name of the second continuous-captured image;
   generating second continuous-photographing number information indicating an order of continuous-photographing of the second continuous-captured image by incrementing the stored first continuous-photographing number information by 1;
   generating a third name for a third continuous-captured image following the second continuous-captured image according to the DCF rules;
   deriving the stored first name; and
   generating a second file having the stored second name, the second file comprising the second continuous-captured image, the first name, the third name, and the second continuous-photographing number information.

2. The digital image signal processing method of claim 1, wherein the second name and the first continuous-photographing number information are stored in an Exif field of the first file.

3. The digital image signal processing method of claim 2, wherein the second name is stored in a region of a next continuous-captured image in the Exif field.

4. The digital image signal processing method of claim 1, wherein the first name, the third name, and the second continuous-photographing number information are stored in an Exif field of the second file.

5. The digital image signal processing method of claim 4, further comprising:
   storing the first name in a region of a previous continuous-captured image in the Exif field; and
   storing the third name in a region of a next continuous-captured image in the Exif field.

6. The digital image signal processing method of claim 1, further comprising:
   determining whether the second continuous-captured image is a last continuous-captured image; and
   if the second continuous-captured image is the last continuous-captured image, updating the first continuous-photographing number information of the first continuous-captured image with the second continuous-photographing number information of the second continuous-captured image.

7. The digital image signal processing method of claim 1, further comprising:
   executing a continuous-photographing play mode;
   playing the first continuous-captured image;
   deriving a second name of a next continuous-captured image following the first continuous-captured image obtained from the first file;
   searching for a second file corresponding to the second name of the next continuous-captured image; and
   playing a second continuous-captured image comprised in the second file.

8. The digital image signal processing method of claim 7, further comprising:
   generating a play list for files complying with DCF rules except for files comprising continuous-captured images other than the first continuous-captured image or a representative image; and
   executing a normal play mode according to the generated play list.

9. The digital image signal processing method of claim 1, further comprising:
   executing a continuous-photographing play mode;
   deleting a continuous-captured image to be played back;
   modifying a region for storing a name of a previous continuous-captured image in a file comprising a next continuous-captured image with respect to the deleted continuous-captured image, by using a name of a previous continuous-captured image with respect to the deleted continuous-captured image;
   modifying a region for storing a name of a next continuous-captured image in a file comprising a previous continuous-captured image with respect to the deleted continuous-captured image, by using a name of a next continuous-captured image with respect to the deleted continuous-captured image; and
   modifying continuous-photographing number information of the first continuous-captured image by subtracting 1 from the continuous-photographing number information.

10. The digital image signal processing method of claim 1, further comprising:
    setting a first representative image;
    setting another continuous-captured image as a second representative image if the first representative image is changed or deleted; and
    modifying continuous-photographing number information of the second representative image into continuous-photographing number information of the first representative image if the first representative image is changed, and modifying the continuous-photographing number information of the second representative image into continuous-photographing number information obtained by subtracting 1 from the continuous-photographing number information of the first representative image if the first representative image is deleted.

11. The digital image signal processing method of claim 10, further comprising modifying a region for storing a name of a previous continuous-captured image or a region for storing a name of a next continuous-captured image in an Exif field of a file comprising the second representative image, by using a name of a previous continuous-captured image or a name of a next continuous-captured image stored in an Exif field of a file comprising the first representative image.

12. The digital image signal processing method of claim 1, further comprising searching for a deleted continuous-captured image.

13. The digital image signal processing method of claim 12, wherein the searching for the deleted continuous-captured image comprises:
    searching for a continuous-captured image of a predetermined order from a last continuous-captured image or a first continuous-captured image;
    comparing continuous-photographing number information indicating an order of continuous-photographing of the continuous-captured image of the predetermined order with the predetermined order; and
    searching for the deleted continuous-captured image among continuous-captured images preceding or following the continuous-captured image of the predetermined order if the continuous-photographing number information does not match the predetermined order.

14. The digital image signal processing method of claim 12, wherein the searching for the deleted continuous-captured image comprises:
    searching for a continuous-captured image after a predetermined interval from a currently played continuous-captured image to derive the last continuous-captured image; and
    determining whether the first continuous-captured image is deleted from continuous-photographing number information indicating an order of continuous-photographing of the last continuous-captured image.

15. The digital image signal processing method of claim 14, further comprising setting a next continuous-captured image following the first continuous-captured image as a new first continuous-captured image and modifying information stored in an Exif field of the next continuous-captured image to correspond to the new first continuous-captured image, if the first continuous-captured image is deleted.

16. The digital image signal processing method of claim 14, the searching for the deleted continuous-captured image comprises determining whether the last continuous-captured image is deleted based on continuous-photographing information of the first continuous-captured image.

17. The digital image signal processing method of claim 16, further comprising setting a previous continuous-captured image preceding the last continuous-captured image as a new last continuous-captured image and modifying information stored in an Exif field of the previous continuous-captured image to correspond to the new last continuous-captured image, if the last continuous-captured image is deleted.

18. A digital image signal processing apparatus comprising:
    a continuous-captured image generating unit configured to generate a first continuous-captured image in a continuous-photographing mode;
    a Design Rule for Camera File Systems (DCF) generating unit configured to generate a first name of the first continuous-captured image according to DCF rules and to generate a second name for a second continuous-captured image following the first continuous-captured image according to the DCF rules;
    a continuous-photographing number information generating unit configured to generate first continuous-photographing number information indicating an order of continuous-photographing of the first continuous-captured image;
    a storing unit configured to store the first name, the second name, and the first continuous-photographing number information;
    a file generating unit configured to generate a first file having the first name, the first file comprising the first continuous-captured image, the second name, and the first continuous-photographing number information; and
    a name deriving unit configured to derive the stored second name of the second continuous-captured image,
    wherein:
    the continuous-photographing unit is further configured to generate the second continuous-captured image following the first continuous-captured image,
    the continuous-photographing number information generating unit is further configured to generate second continuous-photographing number information indicating an order of continuous-photographing of the second continuous-captured image by incrementing the stored first continuous-photographing number information by 1,
    the DCF generating unit is further configured to generate a third name for a third continuous-captured image following the second continuous-captured image according to the DCF rules, and
    the file generating unit is further configured to generate a second file having the stored second name, the second file comprising the second continuous-captured image, the first name, the third name, and the second continuous-photographing number information.

19. The digital image signal processing apparatus of claim 18, wherein the file generating unit stores the second name and the first continuous-photographing number information in an Exif field of the first file.

20. The digital image signal processing apparatus of claim 19, wherein the file generating unit stores the second name in a region of a next continuous-captured image in the Exif field.

21. The digital image signal processing apparatus of claim 18, wherein the file generating unit stores the first name, the third name, and the second continuous-photographing number information in an Exif field of the second file.

22. The digital image signal processing apparatus of claim 21, wherein the file generating unit stores the first name in a region of a previous continuous-captured image in the Exif field and stores the third name in a region of a next continuous-captured image in the Exif field.

23. The digital image signal processing apparatus of claim 18, further comprising:
    a determining unit configured to determine whether the second continuous-captured image is a last continuous-captured image; and
    an updating unit configured to update the first continuous-photographing number information of the first continuous-captured image with the second continuous-photographing number information of the second continuous-captured image, if the second continuous-captured image is the last continuous-captured image.

24. The digital image signal processing apparatus of claim 18, further comprising:
    a play mode executing unit configured to execute a continuous-photographing play mode;
    a file restoring unit configured to derive a second name of a next continuous-captured image following the first continuous-captured image obtained from the first file;

a file searching unit configured to search for a second file corresponding to the second name of the next continuous-captured image; and a display unit configured to play a second continuous-captured image comprised in the second file.

25. The digital image signal processing apparatus of claim 24, further comprising a play list generating unit configured to generate a play list for files complying with DCF rules except for files comprising continuous-captured images other than the first continuous-captured image or a representative image, wherein the play mode executing unit is configured to execute a normal play mode according to the generated play list.

26. The digital image signal processing apparatus of claim 18, further comprising:

an image deleting unit configured to delete a continuous-captured image to be played back; and a continuous-photographing information modifying unit configured to update a region for storing a name of a previous continuous-captured image in a file comprising a next continuous-captured image with respect to the deleted continuous-captured image by using a name of a previous continuous-captured image with respect to the deleted continuous-captured image, to update a region for storing a name of a next continuous-captured image in a file comprising a previous continuous-captured image with respect to the deleted continuous-captured image by using a name of a next continuous-captured image with respect to the deleted continuous-captured image, and to modify continuous-photographing number information of the first continuous-captured image by subtracting 1 from the continuous-photographing number information.

27. The digital image signal processing apparatus of claim 18, further comprising:

a representative image changing unit configured to change or deleting a first representative image;

a representative image setting unit configured to set another continuous-captured image as a second representative image if the first representative image is changed or deleted; and a continuous-photographing information modifying unit configured to modify continuous-photographing number information of the second representative image into continuous-photographing number information of the first representative image if the first representative image is changed, and to modify the continuous-photographing number information of the second representative image into continuous-photographing number information obtained by subtracting 1 from the continuous-photographing number information of the first representative image if the first representative image is deleted.

28. The digital image signal processing apparatus of claim 27, wherein the continuous-photographing information modifying unit is configured to modify a region for storing a name of a previous continuous-captured image or a region for storing a name of a next continuous-captured image in an Exif field of a file comprising the second representative image by using a name of a previous continuous-captured image or a name of a next continuous-captured image stored in an Exif field of a file comprising the first representative image.

29. The digital image signal processing apparatus of claim 18, further comprising a deleted image searching unit configured to search for a deleted continuous-captured image.

30. The digital image signal processing apparatus of claim 29, wherein the deleted image searching unit is configured to search for a continuous-captured image of a predetermined order from a last continuous-captured image or a first continuous-captured image, to compare continuous-photographing number information indicating an order of continuous-photographing of the continuous-captured image of the predetermined order with the predetermined order, and to search for the deleted continuous-captured image among continuous-captured images preceding or following the continuous-captured image of the predetermined order if the continuous-photographing number information does not match the predetermined order.

31. The digital image signal processing apparatus of claim 29, wherein the deleted image searching unit is configured to search for a continuous-captured image after a predetermined interval from a currently played continuous-captured image to derive the last continuous-captured image and to determine whether the first continuous-captured image is deleted from continuous-photographing number information indicating an order of continuous-photographing of the last continuous-captured image.

32. The digital image signal processing apparatus of claim 31, further comprising a continuous-photographing information modifying unit configured to set a next continuous-captured image following the first continuous-captured image as a new first continuous-captured image and to modify information stored in an Exif field of the next continuous-captured image to correspond to the new first continuous-captured image, if the first continuous-captured image is deleted.

33. The digital image signal processing apparatus of claim 29, wherein the deleted image searching unit determines whether the last continuous-captured image is deleted based on continuous-photographing information of the first continuous-captured image.

34. The digital image signal processing apparatus of claim 33, further comprising a continuous-photographing information modifying unit configured to set a previous continuous-captured image preceding the last continuous-captured image as a new last continuous-captured image and to modify information stored in an Exif field of the previous continuous-captured image to correspond to the new last continuous-captured image, if the last continuous-captured image is deleted.

* * * * *